United States Patent
Lautenschläger et al.

(10) Patent No.: US 12,030,788 B2
(45) Date of Patent: Jul. 9, 2024

(54) PROCESS FOR SOLID SYNTHESIS OF MIXED METAL OXIDES, AND SURFACE MODIFICATION OF SAID MATERIALS AND USE OF SAID MATERIALS IN BATTERIES, IN PARTICULAR AS CATHODE MATERIALS

(71) Applicant: Iontech Systems AG, Heerbrugg (CH)

(72) Inventors: Werner Lautenschläger, Heerbrugg (CH); Jens Lautenschläger, Heerbrugg (CH); Sebastian Oberwalder, London (GB)

(73) Assignee: IONTECH SYSTEMS AG, Heerbrugg (AT)

( * ) Notice: Subject to any disclaimer, the term of this patent is extended or adjusted under 35 U.S.C. 154(b) by 606 days.

(21) Appl. No.: 16/764,630

(22) PCT Filed: Nov. 16, 2018

(86) PCT No.: PCT/EP2018/081503
§ 371 (c)(1),
(2) Date: May 15, 2020

(87) PCT Pub. No.: WO2019/096967
PCT Pub. Date: May 23, 2019

(65) Prior Publication Data
US 2020/0385283 A1   Dec. 10, 2020

(30) Foreign Application Priority Data
Nov. 17, 2017   (DE) .................... 10 2017 220 619.5

(51) Int. Cl.
| | | |
|---|---|---|
| *C01G 53/00* | (2006.01) | |
| *H01M 4/02* | (2006.01) | |
| *H01M 4/04* | (2006.01) | |
| *H01M 4/36* | (2006.01) | |
| *H01M 4/525* | (2010.01) | |

(52) U.S. Cl.
CPC .......... *C01G 53/44* (2013.01); *H01M 4/0407* (2013.01); *H01M 4/366* (2013.01); *H01M 4/525* (2013.01); *C01P 2004/61* (2013.01); *C01P 2004/62* (2013.01); *H01M 2004/028* (2013.01)

(58) Field of Classification Search
CPC .... H01M 4/0407; H01M 4/366; H01M 4/525; H01M 4/485; C01P 2004/61; C01P 2004/62
See application file for complete search history.

(56) References Cited

U.S. PATENT DOCUMENTS

| | | | |
|---|---|---|---|
| 6,083,642 A | 7/2000 | Kato et al. | |
| 6,699,456 B1 | 3/2004 | Horst et al. | |
| 10,020,493 B2 * | 7/2018 | Parans Paranthaman | ................... H01M 4/0471 |
| 10,573,879 B2 | 2/2020 | Yang et al. | |
| 2011/0065006 A1 * | 3/2011 | Ogasa | ................. H01M 4/5825 156/60 |
| 2014/0038058 A1 * | 2/2014 | Holzapfel | ............. H01M 4/485 423/598 |
| 2017/0084919 A1 * | 3/2017 | Kao | ....................... H01M 4/505 |
| 2017/0237314 A1 | 8/2017 | Moore et al. | |

FOREIGN PATENT DOCUMENTS

| | | | |
|---|---|---|---|
| EP | 0913876 | * | 5/1999 |
| EP | 0913876 A1 | | 5/1999 |
| JP | 2000251938 A | | 9/2000 |
| JP | 2012048865 A | | 3/2012 |
| WO | 2009013187 A1 | | 1/2009 |
| WO | WO 2009-013187 | * | 1/2009 |

OTHER PUBLICATIONS

International Search Report issued in connection with the corresponding International Application No. PCT/EP2018/081503 dated Jan. 4, 2019.
Machine translation of WO 2009013187 to Kapov et al.
Machine translation of EP 0913876 to Yan et al.
Machine translation of JP 2012048865 A to Shinji et al.

* cited by examiner

*Primary Examiner* — Brittany L Raymond
(74) *Attorney, Agent, or Firm* — The H.T. Than Law Group

(57) ABSTRACT

The present invention relates to a process for producing mixed metal oxide particles, in which particles from parent compounds are converted by contactless energy input. The invention also relates to a process for coating bodies, preferably transition metal- or metal particles, transition metal- or metal oxide particles, transition metal- or mixed metal oxide particles, or silicon- or sulphur particles, especially preferably particles having a mass of less than one milligram and being in the form of grains, fibers, hollow fibers, or 2D structures, by heating with the exclusion of oxygen in the presence of a carbon source.

15 Claims, No Drawings

PROCESS FOR SOLID SYNTHESIS OF MIXED METAL OXIDES, AND SURFACE MODIFICATION OF SAID MATERIALS AND USE OF SAID MATERIALS IN BATTERIES, IN PARTICULAR AS CATHODE MATERIALS

SUMMARY

The invention relates to a synthesis process for producing metal mixed oxides, preferably transition metal mixed oxides, particularly suitable for use in batteries. The synthesis is effected by contactless energy input, preferably by means of electromagnetic radiation and particularly preferably using microwave radiation. For this purpose, the starting materials are present as precomminuted particles in a stoichiometric ratio. The starting metals are preferably present as salts, particularly preferably as acetates.

For use in batteries, the metal mixed oxides produced according to the invention are processed further in a plurality of stages, in particular surface-coated using a specific method. Here, surface coating is carried out by provision of a suitable carbon source and contactless energy input, preferably by means of electromagnetic radiation and particularly preferably using microwave radiation.

For use in batteries, preference is given, as early as during the synthesis of the material, to integrating electrolytes, in particular solid electrolytes, directly into the cathode materials or on the surfaces thereof.

Likewise, further processing steps can be advantageous, in particular etching in order to produce multiphase materials and quenching to improve the internal homogeneity.

Finally, the materials produced according to the invention can be the basis of a novel battery production technology in which manufacture of the batteries can be carried out without the presence of alkali metals or alkaline earth metals. As a result, these materials are independent of the type of cation source used and thus equally well suited for a plurality of different cation sources, which, in particular, results in considerable cost savings and processing advantages.

In a particularly preferred embodiment, doped nickel-manganese-cobalt (NMC) battery materials which are particularly suitable for processing using relatively inexpensive alkali metals or alkaline earth metals are disclosed. In a particularly preferred embodiment, processing of the base material is carried out in the absence of alkali metals, with addition of sodium only during battery formation.

DESCRIPTION

Prior Art

In the prior art, the production of metal mixed oxides, in particular of battery materials, is usually carried out wet-chemically. Here, the dissolved salts of the appropriate metals are mixed in the desired ratios and (co)crystallized. This is usually effected by addition of chemicals in a pH-controlled environment. The crystallization products formed are subsequently precipitated by addition of further chemicals. This is followed by usually complicated separation, purification, washing and comminution/milling processes. Residual water and/or impurities are subsequently removed by drying or heating. Finally, the salt radicals are replaced by oxygen and the materials are converted into their oxide state by means of a firing process/calcination step. In general, further processing steps are then still necessary, in particular comminution/milling processes.

To effect surface coating of the materials produced in this way, mechanical processes such as drum coating and also thermomechanical combination processes such as drum coating with heating and addition of further materials and reaction chemicals are predominantly used in the prior art.

The further processing to give batteries is likewise carried out wet-chemically, in particular by slurry coating processes, in the prior art.

In the prior art, electrolytes are generally likewise added in liquid form, for example as (standard) liquid electrolytes, or as suspension of solid electrolytes.

In the prior art, subsequent addition of the cation source is also not possible effectively, for which reason this has to be added as part of the metal oxide. This results in not only increased complication of manufacture but also in manufacturing problems such as production losses of lithium during heating/calcining. This is associated with not only additional costs, due, inter alia, to the necessity of using (considerable) excesses of material, but also corresponding recovery problems and environmental problems. In addition, the use of different cation sources is not possible with one-and-the-same base material, or use of cation sources other than lithium is generally encumbered by sometimes considerable difficulties.

The present invention provides a route for dry synthesis or solid-state synthesis which makes do without wet chemicals and solvents, resulting in considerable cost and environmental advantages. Likewise, the number of required process steps can be considerably reduced, which offers further significant cost advantages.

The process of the invention has also been found to be superior in respect of further-processability, as a result of the material produced according to the invention surprisingly being able to be provided directly with solid electrolytes, which makes subsequent addition of the electrolytes and possibly also the wet-chemical slurry coating process dispensable, or at least leads to a considerable reduction in the additional chemicals required (for example binders). Likewise, it surprisingly makes it possible to add the cation source only afterwards in the course of the battery formation process.

Furthermore, processes for the further processing of the materials produced according to the invention for use in batteries, in particular as cathode materials, are provided, which processes are likewise distinguished from the prior art in terms of a reduction in the number of process steps and amounts of process chemicals used and also the resulting cost savings and/or technically superior materials.

Finally, the invention provides, in a particularly preferred embodiment, specific doping materials for battery materials, in particular nickel-manganese-cobalt cathode materials ("NMC materials"), which considerably assists the use of cation sources other than lithium, in particular sodium, magnesium and aluminum.

DESCRIPTION OF THE INVENTION

The present invention provides a process for producing mixed metal oxide particles, wherein particles of starting compounds are reacted by means of contactless energy input.

A mixed metal oxide (metal mixed oxide) or transition metal mixed oxide is, for the purposes of the present invention, a mixed metal oxide which comprises two or more (transition) metals. A mixed metal oxide preferably comprises three or more (transition) metals, more preferably from three to six (transition) metals, more preferably four or more (transition) metals and particularly preferably four or five (transition) metals. A transition metal mixed oxide particularly preferably comprises from 1 to 4 transition metals.

A mixed metal oxide or transition metal mixed oxide can optionally also comprise a nonmetal such as phosphorus, especially when only one or two metals are present (e.g. $LiFePO_4$ or the like).

A mixed metal oxide which is produced by the process of the invention preferably comprises at least one transition metal selected from the group consisting of titanium, vanadium, manganese, iron, cobalt, nickel, yttrium, zinc, silver and cadmium. Particular preference is given to at least one transition metal selected from the group consisting of manganese, iron, cobalt, nickel and yttrium.

A mixed metal oxide particularly preferably comprises at least one alkali metal or alkaline earth metal and/or aluminum and/or tin. The alkali metal or alkaline earth metal is preferably selected from among lithium, sodium, potassium and magnesium.

Preferred mixed metal oxides comprise nickel, manganese and cobalt, preferably in combination with lithium, sodium, magnesium and/or aluminum.

Other preferred mixed metal oxides comprise cobalt, nickel, manganese and yttrium, preferably in combination with lithium or sodium. Other preferred mixed metal oxides comprise iron and lithium in combination with phosphorus.

For the purposes of the present invention, a mixed metal oxide or transition metal mixed oxide preferably comprises at least one (transition) metal oxide and at least one further element which can also be an alkali metal or alkaline earth metal or a nonmetal. The mixed oxide preferably comprises from two to five elements plus oxygen, more preferably at least one transition metal and at least one alkali metal or alkaline earth metal plus oxygen.

Examples of particularly preferred mixed metal oxides which comprise a transition metal and an alkali metal are, for example, $LiCoO_2$, $LiCoO_2$, $LiNiO_2$, $LiMnO_2$ and $Li_4Ti_5O_{12}$ and also spinels such as $LiMn_2O_4$, and the like.

Examples of particularly preferred mixed metal oxides which comprise two or more transition metals and an alkali metal are, for example, $LiNi_{1-x}Co_xO_2$ (where 0<x<1), $Li[Ni_{xa}Mn_{ya}Co_{za}]O_2$ (where xa+ya+za=1; e.g. $LiNi_{0.33}Co_{0.33}Mn_{0.33}O_2$), $LiNi_{0.85}Co_{0.1}Al_{0.05}O_2$, $Na[Ni_{xa}Mn_{ya}Co_{za}Y_{xb}]O_2$ (where xa+ya+za+xb=1; eg. $Na[Ni_{0.58}Mn_{0.32}Co_{0.092}Y_{0.008}]O_2$), and the like.

Examples which additionally comprise a nonmetal are, for example, $LiPePO_4$, $LiFeYPO_4$ and the like.

The starting compounds are preferably salts of the corresponding metals (for example acetate salts or acetate salt hydrates) which are provided as particles in the stoichiometric ratio required for the desired product.

The particles of the starting compounds preferably have a particle size of up to a few millimeters, for example 10 mm or less, more preferably 5 mm or less, more preferably 2 mm or less, more preferably 1 mm or less and particularly preferably 0.5 mm or less.

The desired mixed metal oxides are preferably synthesized by the starting substances being comminuted to give particles having a particle size of 250 microns or less (≤250 µm), more preferably 100 microns or less (≤100 µm), more preferably 50 µm or less (≤50 µm), more preferably twenty microns or less (≤20 µm), more preferably ten microns or less (≤10 µm), more preferably one micron or less (≤1 µm) and particularly preferably 0.1 µm or less (≤0.1 µm), or particles having this particle size being provided and a synthesis involving these particles then being initiated by contactless energy input.

When particles of the starting compounds having particle sizes of more than 250 µm are used, an additional treatment step can be necessary in order to produce mixed metal oxide particles suitable for battery applications. A preferred example of such an after-treatment is, for example, a homogenization step, for example by treatment with an Ultraturrax mixer, by treatment with ultrasound in solution, or the like. The additional steps of washing/rinsing or separation filtration which are necessary here increase the complication and the costs of the synthesis. For example, they can be associated with disadvantages such as increased energy consumption, wastewater problems, disposal of solvents, detoxification of vapors, etc.

The size of the particles of the starting compounds can be adjusted by, for example, sieving. A measurement of the particle size can also be carried out optically, optionally using appropriate enlargement (e.g. by means of a microscope or electron microscope).

In the process of the invention, the particles of the starting compounds can be used with or without additional solvents, catalysts or other processing aids, preferably without these. The process of the invention is particularly preferably carried out as a solid-state reaction, in particular as dry solid-state reaction. As a result of the energy input occurring in a contactless manner, there is neither precipitation of the starting materials on a particular heat source nor caking of the particles to form significantly larger units/lumps or even a melt in the process of the invention. In a particularly preferred embodiment, the particles of the starting compound are used in the form of a dry mixture of separate particles composed in each case of a starting compound, with the individual particles not being joined to one another, agglomerated, aggregated, pressed or the like.

In order to obtain the desired end product, the particles of the starting compounds have to be small enough. Comminution to the above-described size ranges is necessary for this purpose. A preferred comminution method is the use of jet mills. To achieve particularly small particle sizes, it is possible to dehydrate starting materials prepared as hydrates in an intermediate step (for example: cobalt(II) acetate tetrahydrate, nickel(II) acetate tetrahydrate, manganese(II) acetate tetrahydrate, manganese(III) acetate dihydrate, lithium acetate dihydrate), after initial comminution (e.g. to about a hundred microns (100 µm)), as a result of which these materials become porous and are particularly suitable for further comminution. As an alternative or in addition, the materials can also be calcined, i.e. the salts can be converted into the oxide form by heating with elimination of the volatile counterion. The dehydration and/or calcination can be carried out using all known methods, in particular also by heating with contactless energy input, more preferably by input of microwaves under subatmospheric pressure. The porous materials formed in this way can then be more easily comminuted further, which can result in a particularly small particle size. Very good mixing of the particles also occurs at the same time in the jet mill when, as preferred, all metals or metal salts are milled together.

For this purpose, the particles are preferably provided in the desired direct stoichiometric ratio corresponding to the desired products.

The energy input has to occur in a contactless manner. A preferred energy method is irradiation with electromagnetic radiation, in particular with a wavelength of from 200 nm to 50 cm. The use of a microwave source which excites the metal particles directly is particularly preferred here. Suitable microwave sources are magnetrons which radiate microwave radiation in the wavelength range from 1 cm to 50 cm (600 MHz to 30 GHz) with a power of from 20 to 2000 watt. For example, it is possible to use standard magnetrons which, for example, at a power of from 500 to 1000 watt radiate microwaves having a wavelength of about 12 cm (2.45 GHz, 2.455 GHz, 2.46 GHz) or having a wavelength of about 30 cm (860 MHz, 915 MHz). As an alternative, lasers, electromagnetic induction or electron beams are in principle also suitable as energy sources, but electron beams and lasers as relatively expensive energy sources are less economical and in the case of electromagnetic induction it may be necessary to use other starting materials, which can likewise have an adverse effect on the economics. Examples of lasers are $CO/CO_2$ lasers or solid-state lasers, for example diode lasers, e.g. a neodymium-doped yttrium aluminum garnet laser (Nd:YAG).

Due to the contactless introduction, the energy goes directly over to the individual particles or the heating goes out directly from these by injection of the wave. The collision frequency necessary for the synthesis is attained (only) where it is needed. There is thus no caking of the synthesis products, and subsequent remilling is in principle not necessary (depending on the intended use). The preferred particle size of the end products is 20 microns or less, more preferably 10 microns or less and very particularly preferably 1 micron or less.

The energy input is preferably effected with continual movement of the particles, for example by means of stirring and/or rotation of the reaction vessel and/or passage through an inclined plane.

The starting materials are preferably present as solids which have vaporizable components, more preferably as salts. Among salts, particular preference is given to acetates. The salts are more preferably present as hydrates (for example: cobalt(II) acetate tetrahydrate, nickel(II) acetate tetrahydrate, manganese(II) acetate tetrahydrate, manganese (III) acetate dihydrate, lithium acetate dihydrate). The reaction of other salts, for example carbonates to form acetates as precursor for the same process, is likewise possible (e.g.: $Li_2CO_3 + 2\ CH_3COOH \rightarrow 2CH_3COOLi + CO_2 + H_2O$), preferably assisted by contactless input of reaction energy, for example by means of microwave radiation.

As a result of the use of these relatively large molecules, only a (relatively) small number of metal atoms are present per particle in the preferred comminution range, which leads to very good homogeneity of the end product. Likewise, the metal atoms represent only a small proportion of the total material or total molecule in the case of the preferred compounds, for which reason evaporation of the volatile components (=dehydration and thermal decomposition of the salts) forms a porous body which is both outstandingly suitable for further comminution (see above) and also for reaction or fusion with other metals present in the immediate vicinity. This dehydration and thermal decomposition preferably occurs, as described, by means of contactless energy input, more preferably by uniform point heating with microwave radiation.

The size decrease brought about by dehydration/decomposition also compensates for particle growth by fusion of particles, for which reason the end products of the process generally have about the same particle size as the starting products. Likewise, very large and extremely reactive surface areas result therefrom, which further promotes both the efficiency of the reaction itself and also the narrowly locally limited course thereof. Finally, the porosity of the particles brought about by the thermal decomposition also offers further sometimes very surprising advantages.

In particular, the presence of these internal voids allows integration of an electrolyte, preferably a solid electrolyte and/or an organo-gel electrolyte, directly into the particles. For this purpose, the solid electrolyte can be provided as early as during the synthesis in suitable form, including as a combination of precursor substances, or else can be provided (immediately) after conclusion of the synthesis in a further process step with contactless energy input. Organo-gel electrolytes are also applied after conclusion of the synthesis. Preferred solid electrolytes are, in particular, lithium-rich antiperovskites (lithium-rich antiperovskites, e.g.: $Li_3OBr$ or $Li_3OCl$), boron hydrides (e.g.: $BH_4^-$, e.g.: $LiBH_4$, $NaBH_4$) and lithium salts having sulfur-containing anions, in particular $Li_2S$ or $Li_3PS_4$, and also lithium phosphate nitrate ($Li_3PO_4N$).

Preferred organo-gel electrolytes are cyano resins such as PVA-CN in EC:EMC/$LiPF_6$/FEC, where PVA-CN=cyanoethyl polyvinyl alcohol; EC=ethylene carbonate; EMC=ethyl methyl carbonate; $LiPF_6$=lithium hexafluorophosphate; FEC=fluoroethylene carbonate.

In principle, coating with or fusion of solid electrolytes can also be carried out using (metal oxide) particles produced by a method which is not according to the invention or microwave-reflecting bodies of all types with contactless energy input, for which reason this coating or fusion is claimed both in combination with the inventive materials and also independently.

The direct integration of solid electrolytes into battery materials reduces the risk of fire considerably compared to the prior art. Likewise, a significant reduction in the amount of conductive additives is possible and desirable because of the improved conductivity in the case of integration of a solid electrolyte. These reductions in amounts of additives lead to a significant cost reduction, and also to a significant increase, compared to the prior art, in the capacity of the batteries produced in this way.

If a porous structure of the particles is desirable, or as soon as all further substances have been introduced into the voids, the porous structure can be impaired or destroyed by internal compression processes (quenching) of the material. For this purpose, rapid cooling of the surface is carried out after the synthesis or continual cooling of the surroundings is carried out during the synthesis, as a result of which the surface remains significantly colder or cools significantly more quickly than the core, resulting in internal compression (quenching) of the material. Here too, the advantage that only point heating takes place because of the contactless energy input and cooling is thus possible during the process without the process being significantly influenced and the energy consumption also remains acceptable is also exploited here. Quenching is preferably effected by feeding-in (relatively) cool gas or transferring the hot particles into a microwave-transparent liquid which is at room temperature (about 20° C.). However, depending on the desired further processing, it can be desirable to omit this step in order to exploit the nanoporous structure for further process steps or to early out the step of internal compression only at a later point in time during the overall production process.

A further process step, which can optionally be carried out at this point in the process or at a later juncture or can also be omitted entirely, is etching of the particles. This serves, in particular, to achieve a phase transition or layer structure within the particles produced, e.g. in the preferred NMC cathode materials. Here, for example, lithium is removed from the outer layers of the particles in the case of a lithium-nickel-manganese-cobalt oxide. This is preferably effected by heating the particles, preferably by means of contactless energy input/microwaves, in a suitable reactive atmosphere composed of an inert gas, for example argon, and a reactive gas, for example ammonia ($NH_3$) and/or sulfur hexafluoride ($SF_6$). The reactive atmosphere particularly preferably comprises the reactive gas in small concentrations (e.g. Ar 98%, $SF_6$ 2%), since the reaction can proceed strongly exothermically.

The metal mixed oxide particles produced according to the invention are preferably coated with a carbon layer after the production thereof (and optionally addition of electrolyte and/or quenching and/or etching).

This coating operation can be carried out directly after the first synthesis step by bringing the previously heated/warmed particles into contact with a carbon source with exclusion of oxygen. The exclusion of oxygen can be achieved by means of a protective atmosphere or by reaction in a liquid. It is preferably carried out with continuous movement of the particles, for example by means of stirring and/or rotation of the reaction vessel and/or by passage through an inclined plane. Coating is preferably carried out with further heating by contactless energy input using electromagnetic radiation from the microwave range to the high-frequency range (wavelength from 200 nm to 50 cm), more preferably by means of microwave radiation in the range from 1 to 50 cm. The particles can likewise be heated separately from or independently of the first step, once again preferably by means of contactless energy input as described above. Furthermore, not only the inventive particles but also all bodies, preferably particles produced in another way, grains, fibers, hollow fibers or 2D structures, preferably those having a mass of one milligram or less, more preferably those having a mass of a hundred micrograms or less, can be coated using this process. Apart from the inventive materials, coating of, in particular, silicon (Si), sulfur (S), semimetals (examples of semimetals are silicon, germanium, arsenic and the like), transition metals (examples of transition metals are nickel, manganese, cobalt, iron, copper, zinc, vanadium, yttrium, silver, niobium, titanium, cadmium and the like, preferably nickel, manganese, cobalt and iron) and metals (examples of metals are aluminum, tin and optionally gallium, lead, bismuth and the like) and/or oxides thereof or a combination of two or more of these metals is preferred, with silicon, sulfur and oxides of the transition metals being particularly preferred. In addition, the coating process of the invention can naturally also be carried out using mixed oxide particles which have not been produced by the production process of the invention. Due to this possibility of independent surface treatment, the process is claimed here both in combination with the basic synthesis and also independently.

The carbon source is preferably present in the form of a hydrocarbon source, preferably liquid or gaseous, more preferably as microwave-transparent compound. Particular preference is given to, either individually or in combination with one another: liquid: pentane, hexane, heptane, octane, nonane, decane, including all isomers, for example n-hexane, 2-methylpentane, and also all cyclic forms, for example cyclohexane, or gaseous: methane, ethane, propane, n-butane and isobutane. Gases are preferably present as constituent of an oxygen-free mixture with nitrogen and/or argon and/or hydrogen, for example: propane 5%, hydrogen 2%, argon 93%.

In a preferred embodiment, the particles to be coated are dispersed in the hydrocarbon source. For example, the particles to be coated can be dispersed in a liquid or gaseous hydrocarbon source with continual movement of the particles.

The heating of the particles, preferably at points by means of contactless energy input in the form of microwaves, causes thermal dissociation of the hydrocarbons. Because this takes place in a targeted manner directly on the particle surface, attachment of the liberated hydrocarbon to the particle surface also occurs. This is reinforced by the reductive effect of the liberated hydrogen, or the hydrogen which is additionally present in the protective atmosphere.

The fact that only brief local heating takes place in the case of contactless heating of the particles with movement is particularly advantageous, for which reason only the energy necessary for the reaction is achieved but melting of the particles or fusion of different particles or even clumping together of the material or attachment of the material to the surfaces of the reaction vessel does not also occur.

A further particularly advantageous aspect of the use of microwave radiation is that the microwaves heat only the particles but not the carbon source. As a result, the process can proceed at moderate ambient temperatures, for example in a cyclohexane bath having a liquid temperature significantly below the boiling point. This results in barely any undesirable losses of the carbon source. Relatively small amounts which nevertheless vaporize below the boiling point can easily remain enclosed in a closed vessel without risk of generation of a particular superatmospheric pressure, and recovery from the then very cool exhaust air is likewise readily possible. Likewise, the attached carbon is not heated or heated only very little. This leads to the formation of the carbon layer being hindered or slowed by carbon deposits already present, as a result of which a very homogeneous and very thin coating is formed. Such thin homogeneous coatings are particularly suitable for industrial applications, in particular as battery materials. Thus, a very thin carbon coating leads, for example in the case of cathode materials, to significant savings of conductive additives and also cathode volume, which leads not only to significant cost savings but also to a significant increase in the volumetric capacity.

Likewise, the particles can by means of this method be coated not only with carbon but also with other materials in a targeted manner, for example with silicon and the like, and also, in particular, with solid electrolytes or precursors thereof. Preferred examples are, for example, $Li_2S$, $Li_3OBr$ or $Li_3OCl$, boron hydrides (e.g. $BH_4^-$, e.g.: $LiBH_4$, $NaBH_4$) and also $Li_3PO_4N$ and the like.

The use of all the above-described inventive materials in batteries (e.g. primary cells, rechargeable batteries (secondary cells), and the like) and/or electrochemical systems of all types is expressly claimed once again.

Owing to its porous structure and/or the integration of (solid) electrolytes directly into the particles, the inventive material can remain free of alkali metals or alkaline earth metals during the stack/cell/battery production process. Apart from the resulting advantages in the process architecture and also cost savings, this also makes the present technology independent in respect of the cation source used (=the alkali or alkaline earth metal used). The batteries of the invention can thus use any single alkali or alkaline earth metal or a plurality of different alkali or alkaline earth metals. This can be "monovalent", "divalent" or "trivalent", preferably selected from among: lithium ($Li^+$), sodium ($Na^+$) or potassium ($K^+$) as monovalent ion, magnesium ($Mg^{2+}$) as divalent ion or aluminum ($Al^{3+}$) as trivalent ion, very particularly preferably: lithium, sodium or magnesium. The selected ions are preferably injected as "liquid A" into the cathode during the cell or battery stack forming process. The liquid A here is preferably a solution of a salt of the metal in a suitable solvent, preferably water or dimethyl sulfoxide (DMSO).

When alkali/alkaline earth metals other than lithium are used, doping of the materials with transition metals having a relatively large atomic radius, for example with yttrium, preferably in a ratio of proportion of starting material of 90% or above to a proportion of yttrium of 10% or less, is also preferred. Doping is preferably effected by simultaneous synthesis according to one of the above-described processes.

The procedure for the injection process itself corresponds to the prior art for such processes and can be carried out in any embodiment normally used for such processes. The choice of the suitable process is generally made in accordance with the available or desired production plant.

Preference is given to a production method in which a battery precursor cell which is free of alkali and alkaline earth metals is firstly produced and liquid sources of alkali metal (or alkaline earth metal) ions are subsequently pumped into this. Each cell chamber is preferably supplied separately with the alkali metal ion source, with the liquid circulating through suitable inlet and outlet ports until the suitable cell parameters have been attained. For this purpose, one or more of the following parameters are preferably measured at the respective poles or ports and if necessary, influenced/varied in a suitable way: voltage, temperature, pressure, impedance, molarity/concentration and flow rates of the liquid A (preferably both at the inlet and the outlet). Since this manufacturing method is not restricted to the inventive battery but is also suitable for many types of battery, it is claimed both in combination with the inventive battery and also independently.

EXAMPLES

Example 1

2.99 g of cobalt(II) acetate tetrahydrate, 12.44 g of nickel(II) acetate tetrahydrate, 7.35 g of manganese(II) acetate tetrahydrate, 2.70 g of yttrium(III) acetate tetrahydrate and 11.0 g of lithium acetate dihydrate, all comminuted to particle sizes of less than 10 microns, are placed in a microwave rotary evaporator (Rota-Prep, from MWT AG; 12.2 cm/2.455 GHz). While rotating the rotary evaporator (speed of rotation about 1 Hz/60 rpm), these particles are heated for 10 minutes with a microwave power of a constant 0.500 watt. Water/acetate given off is extracted and replaced by fresh air. The resulting material is processed further by means of standard methods to give battery cells.

Example 2

As example 1, but 8.4 g of lithium chloride and 5.9 g of lithium oxide, likewise precomminuted to particle sizes of less than 10 microns, are additionally placed in the rotary evaporator and the microwave power is increased to 700 watt. In the further processing to give a battery, addition of an electrolyte can be dispensed with.

Example 3

Instead of processing the material resulting from example 1 directly to give batteries, 100 ml of cyclohexane are added after the heating for 10 minutes. The particles are then heated for a further 10 minutes with a microwave power of 500 watt in order to coat them with carbon.

Example 4

As example 1, but without initial charging of lithium acetate dihydrate. Immediately after conclusion of microwave heating, 20 g of 2% (weight) of PVA-CN in 1:2 (volume) EC:EMC/LiPF$_6$/FEC, where PVA-CN=cyanoethyl polyvinyl alcohol, EC=ethylene carbonate; EMC=ethyl methyl carbonate; LiPF$_6$=lithium hexafluorophosphate; FEC=fluoroethylene carbonate, are added. Further microwave heating at a power of 500 watt is then carried out for 2 minutes. In the further processing to give a battery, addition of an electrolyte can be omitted. The battery is produced so that the cathode forms an independent chamber separate from the anode. A 10% solution of lithium chloride in DMSO is introduced into this chamber while applying an external charging voltage of 4.6 V. This solution circulates via an inlet and an outlet for the duration of 3 hours.

The invention claimed is:

1. A process for producing mixed metal oxide particles comprising: reacting particles of starting compounds by means of contactless energy input; wherein the process is carried out as a dry solid-state reaction and wherein the starting compounds are provided in a stoichiometric ratio as particles having a size of two hundred and fifty microns or less (≤250 µm), where the starting compounds are provided as acetates or acetate hydrates; wherein the particles of the starting compounds are used in the form of a dry mixture of separate particles composed in each case of a starting compound, with the separate particles not being joined to one another, agglomerated, aggregated, pressed or the like, and a synthesis involving these particles is then initiated by contactless energy input, wherein water and/or acetate given off is extracted and replaced by fresh air.

2. The process as claimed in claim 1, wherein the starting compounds have a particle size of one hundred microns or less (≤100 µm).

3. The process as claimed in claim 1, wherein the energy input is effected by means of electromagnetic radiation having a wavelength of from 200 nm to 50 cm, or by means of microwave radiation having a wavelength of from 1 to 50 cm.

4. The process as claimed in claim 1, wherein the energy input is carried out with continual movement of the particles.

5. The process as claimed in claim 4, wherein the continual movement of the particles is by stirring and/or rotation of the reaction vessel and/or passage through an inclined plane.

6. The process for producing particles as claimed in claim 1, wherein transition metal, metal oxides, mixed oxides, silicon or sulfur are provided in the stoichiometric ratio with one or more solid electrolytes or solid electrolyte precursor substances as particles having a size of fifty microns or less (≤50 µm), and a synthesis involving these particles or coating of the transition metal or metal oxides, mixed oxides, silicon or sulfur with the solid electrolyte(s) is then initiated by contactless energy input.

7. The process for producing particles as claimed in claim 1, wherein transition metal or metal oxides, mixed oxides, silicon or sulfur are provided in the stoichiometric ratio with one or more organo-gel electrolytes or organo-gel electrolyte precursor substances as particles having a size of fifty microns or less (≤50 µm and fixing of the organo-gel electrolytes to a surface of the particles or within the particles is then initiated by contactless energy input.

8. The process as claimed in claim 1, wherein the particles are cooled quickly on their surface after a heating caused by the contactless energy input in order to achieve an improvement in the internal homogeneity of the particles.

9. The process as claimed in claim 8, wherein the particles are cooled by transfer of the heated particles into a microwave-transparent liquid which is present at room temperature (about 20° C.).

10. The process as claimed in claim 1, wherein the particles are heated by contactless energy input in an atmosphere suitable for removing alkali or alkaline earth metals.

11. The process as claimed in claim 10, wherein the atmosphere comprises ammonia ($NH_3$) and/or sulfur hexafluoride ($SF_6$).

12. A material obtainable by the process as claimed claim 1 doped with a transition metal.

13. The material as claimed in claim 12, wherein the transition metal is yttrium.

14. The material as claimed in claim 12, wherein the proportion of the starting-compounds is 90% or more and the proportion of the doping material is 10% or less of the total amount of the starting compounds and the doping material.

15. A battery and/or electrochemical systems comprising the material claimed in claim 12.

\* \* \* \* \*